United States Patent [19]

McDaniel

[11] 3,890,030

[45] June 17, 1975

[54] LACK OF GROUND INDICATOR

[76] Inventor: Johnny B. McDaniel, 4210 Stanby Ct., Alexandria, Va. 22312

[22] Filed: Sept. 27, 1973

[21] Appl. No.: 401,393

[52] U.S. Cl. ......... 339/113 L; 339/14 P; 339/147 P; 324/51; 340/252 P
[51] Int. Cl. ............................................. H01r 13/66
[58] Field of Search ........ 324/51, 123; 339/14, 113, 339/147; 340/252

[56] References Cited
UNITED STATES PATENTS

| | | | |
|---|---|---|---|
| 2,186,212 | 1/1940 | Scoggin | 324/51 |
| 2,851,659 | 9/1958 | Ladrick | 324/51 |
| 3,383,588 | 5/1968 | Stoll et al. | 339/113 L X |
| 3,685,000 | 8/1972 | Robbins | 339/14 P |
| 3,733,576 | 5/1973 | Cooper | 324/51 |

*Primary Examiner*—Richard E. Moore
*Attorney, Agent, or Firm*—Fidelman, Wolffe & Leitner

[57] ABSTRACT

An indicator device with a resistor connected in series between a first prong and a ground prong and an indicator connected in series between a second prong and the ground prong whereby the indicator is activated to display a lack of ground when the prongs of the indicator device are attached to a three-wire electrical apparatus or system.

10 Claims, 5 Drawing Figures

3,890,030

LACK OF GROUND INDICATOR

BACKGROUND OF THE INVENTION

1. Field of the Invention

This invention relates generally to electrical indicators and more specifically to a lack of ground indicator for use with a three-wire electrical apparatus or system.

2. Description of the Prior Art

The National Safety Council records hundreds of electrical shock accidents annually and many home/industrial electrocution accidents caused in whole or in part by non-grounded electrical power tools and appliances. Additionally, a severe shock hazard exists when power tools and appliances are in use during an electrical storm; where an over-voltage or a power line-short circuit may inadvertently charge the frame of the appliance with a potential lethal voltage.

With the increased use of electrical monitoring equipment in hospitals, there is an increased need for properly grounded equipment. To be more specific, heart patients have a multitude of monitors attached to their bodies and an ungrounded piece of equipment could cause electrical power to be transmitted through the monitoring equipment to the patient. Also, in the hospital environment, electrical noise and improper data may be caused by improperly grounded equipment.

Most modern appliances now feature an internal ground for the motor to the frame and the convenience outlet by use of a third grounding cable contained in the power cord set. In older homes, offices or industrial facilities where the convenience outlet lacks a proper ground opening and lug, the use of an adapter plug socket connector provides electrical power to the appliance which may not afford any degree of ground protection. Some of the adapter wire plugs feature a green coded ground with a connector lug that may be connected beneath the central threaded screw that attaches the receptacle cover plate to the convenience outlet. The National Safety Council points out that most people neglect to make the required connection even if provided because of the following reasons: "lack of an available screwdriver"; "in a hurry"; "didn't understand what the wire was for"; etc.

All adapter-plug sockets exhibit a common troublesome problem for the user, that being that when connected between the appliance connector and the convenience outlet, the resulting combination tends to sag and pull away from the convenience outlet due to the weight or moment of the appliance cord set. This often results in an electrical "Open" as the male prong pulls free of the connector with the appliance losing power or arcing and pitting occurring within the convenience outlet. Similarly, though the two power prongs may remain in electrical contact with the convenience outlet, the ground prong may come loose from the convenience outlet and not make the proper electrical ground.

Based on the various types of plugs to be used in a multitude of types of convenience receptacles, it becomes increasingly important that the portable equipment being used is properly grounded. As described above, the lack of the ground may be caused by the use of an adapter to connect a three prong electrical connector to a two aperture convenience outlet. Also, a lack of ground may occur because the electrical receptacle, into which the plug is inserted, is not properly grounded. Mere inspection of the receptacle and/or the plug at the end of a cord set and its mating with the convenience receptacle will not guarantee nor produce the required knowledge that the portable electrical appliance being used is properly grounded.

Ground indicators of the prior art have generally involved a light in series with a resistor connected between the positive or hot line and ground. This indicator as shown in FIG. 1 will remain lit as long as there is power on the hot line and the grounded line is grounded. The continuous burning of the light to indicate ground shortens the useful life of the ground indicator and makes the cord set of little value after the indicator has burned out. To make the ground light replaceable increases the size of the plug and thus makes it inconvenient and unattractive to the general public. A typical example of this type of grounding indicator is shown in U.S. Pat. No. 2,731,629.

SUMMARY OF THE INVENTION

The present invention is an electrical plug with an integral ground indicator therein to be activated and display a lack of ground when the plug is inserted into a wall receptacle. The circuit includes a resistor connected in series between a first prong of the plug which is adapted to be connected to a hot or positive power line and the grounding prong which is adapted to the receptacle's ground and an indicator connected in series between a second prong of the plug which is adapted to be connected to a neutral or return power line of the wall receptacle and the ground prong. The ground indicating circuit may be included in a standard electrical plug and cord set or may be built in an automatically retractable in a ground electrical plug.

OBJECTS OF THE INVENTION

An object of the present invention is to provide a device which indicates a lack of ground.

Another object of the invention is to provide an economical and attractive and easy to use electrical plug having a lack of ground indicator therein.

A further object of the invention is the provision of an electrical plug having a ground indicator therein which is lit only to indicate lack of ground.

Still another object of the invention is to provide an electrical plug which has an automatically retractable ground plug and a lack of ground indicator therein.

Other objects, advantages and novel features of the present invention will become apparent from the following detailed description of the invention when considered in conjunction with the accompanying drawings.

DESCRIPTION OF THE PREFERRED EMBODIMENTS

Figure 1:
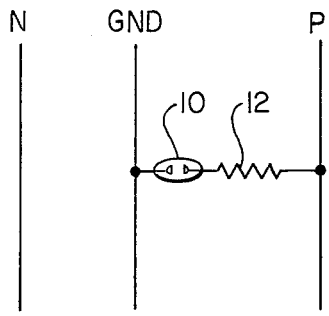
FIG. 1 is a schematic of a ground indicator of the prior art.
Figure 2:
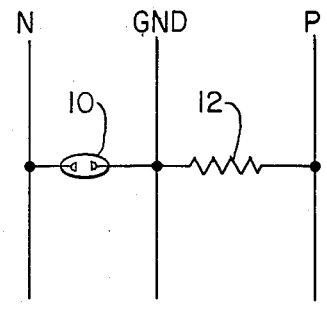
FIG. 2 is an electrical schematic of the lack of ground indicator of the present invention.

As shown in FIG. 1, the prior art generally connects an electrical ground indicator or lamp 10 in series with a resistor 12 between the positive or hot line P and the electrical ground line GND. Also shown is the neutral or returnable line N. The power lines of FIG. 1, and those to be explained in FIG. 2, represent either the power lines themselves or lines within an electrical apparatus or system which are adapted to be connected to the respective power lines as indicated. When the power lines in FIG. 1 are energized as indicated, the indicator 10 will be lit continously as long as the ground or GND line is properly grounded. Thus, whenever the device is used and the light is on, the user can rest assured that the portable piece of equipment that he is using is, in fact, properly grounded. With the continuous use of portable equipment by the consumer, the light 10 or the resistor 12 may fail before the expiration of the useful life of the rest of the portable equipment. Also, the user can become sensitized to a continuously on indicator and is more likely not to observe the lack of said indication which shows the absence of a ground therein.

The preferred embodiment of the present invention, as illustrated in FIG. 2, shows a resistor connected in series between a positive line and a ground line and the indicator connected between a neutral line and the ground line. As indicated previously, the power lines illustrate either the power lines or electrical lines of an apparatus which is adapted to be electrically connected to the power lines indicated in the Figure. Under normal conditions, when the lines are energized as indicated and the ground line is sufficiently grounded, the current will flow from the positive line through the resistor 12 to the ground line. No current flows between the neutral line and the ground line GND through the indicator 10 since they are generally of the same potential or at a potential difference below that which would ignite the indicator 10. When the ground connection is lost, a series circuit is established between the positive line P and the neutral line N through resistor 12 and indicator 10 to ignite the indicator 110 to indicate lack of sufficient ground. Thus, the user of the equipment is immediately alerted by activation of indicator 10 that the portable piece of electrical equipment that he is using is not properly grounded.

Upon noting the lack of ground, the user may check the connection between the plug and the wall receptacle to determine if this is the point at which the ground is not being sufficiently made. The user may also investigate the internal wiring of the plug, the wire set or the electrical equipment which he is using. Similarly, activation of indicator 10 may indicate the receptacle to which the plug set or portable electrical equipment is electrically connected is not properly grounded. A typical example of resistor 12 may be 120,000 ohms and the indicator 10 may be, for example, a neon light having 5,000 hours MTBF (mean time between failure). The indicator circuits as shown in FIG. 2 would have a useful life which far exceeds the life of the electrical equipment to which it would be connected. As is obvious from the mathematics, using the resistor suggested, the curent through the light would be less than a milliampere.

Figure 3:
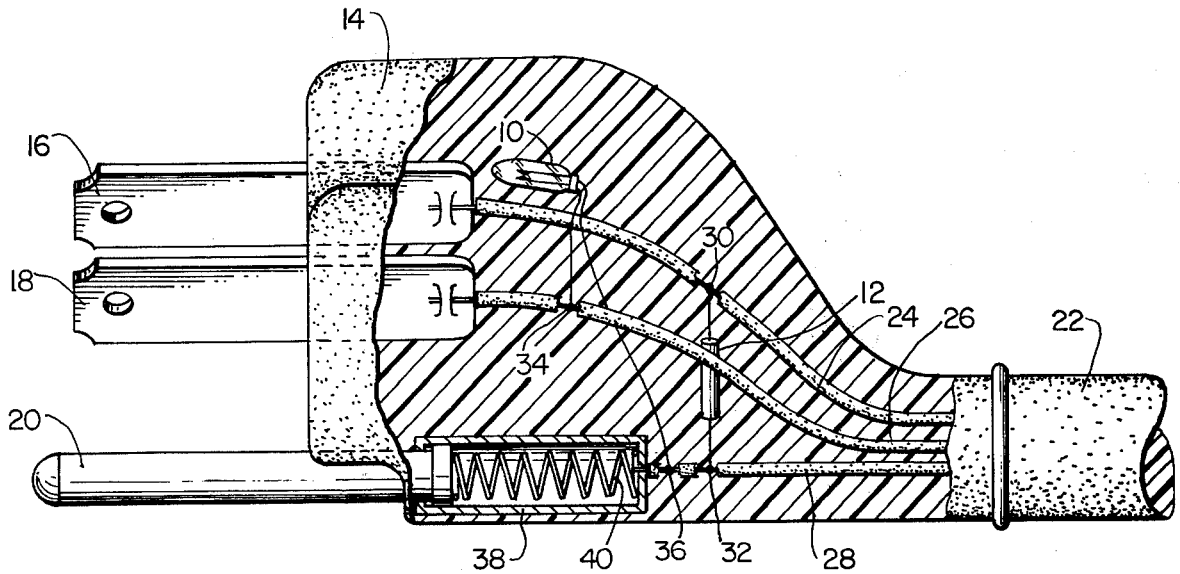
FIG. 3 is a perspective cutaway view of the ground indicator of the present invention as embodied in an electrical plug.

FIG. 3 illustrates the circuit of FIG. 2 embodied in an electrical plug having a body of insulating material 14 with two male prongs 16 and 18 mounted therein, and a ground prong 20 automatically retractable back into the body 14. A three-conductor electrical cord set 22 is attached to the body 14 and includes conductors 24, 26 and 28 connected electrically to prongs 16, 18 and 20. The cord set is generally attached to a portable electrical appliance which is to be grounded for safe use. The resistor 12 is shown as being connected at 30 to line 24 and to line 28 at 32. Indicator 10 is shown electrically connected in series at 34 to line 26 and at 36 to line 28. The ground prong 20 is shown as being generally cylindrical and being slidably received within a cylindrical sleeve 38 which includes a spring 40 to keep the ground prong 20 extended. Conductor 28 is electrically connected to the casing 38 and the metallic spring 40 so as to create a redundant electrical connection to the ground prong 20. Though the plug is shown to have an automatically retractable ground 20, any plug having a standard ground prong secured within the body 14 may also be used.

The plug shown in FIG. 3 is adapted to be connected to an electrical receptacle such that prongs 16 is electrically connected to the positive or hot power line, prong 18 is connected to the neutral or return power line and prong 20 is electrically connected to the receptacle ground. upon the insertion of the plug into an electrical receptacle, the resistor 12 becomes electrically connected in series between the positive power line and the receptacle ground and neon indicator 10 becomes electrically connected in series between the receptacle ground and the neutral line. If line 28 is properly grounded through grounding prong 20 and the convenience receptacle, the current flow will be totally across resistor 12 and there will be no current flow through indicator 10. If line 28 should not be properly grounded, be it a failure of the grounding prong 20 or the ground of the receptacle, current will flow from the positive line P through prong 16, conductor 24, resistor 12, conductor 28 through indicator 10 to conductor 26 through prong 18 to the neutral power line, thus activating the indicator 10. The user of the portable electrical equipment will be immediately notified by the activation of neon indicator 10 that the piece of electrical equipment being used is not properly grounded and may be hazardous.

Figure 4:
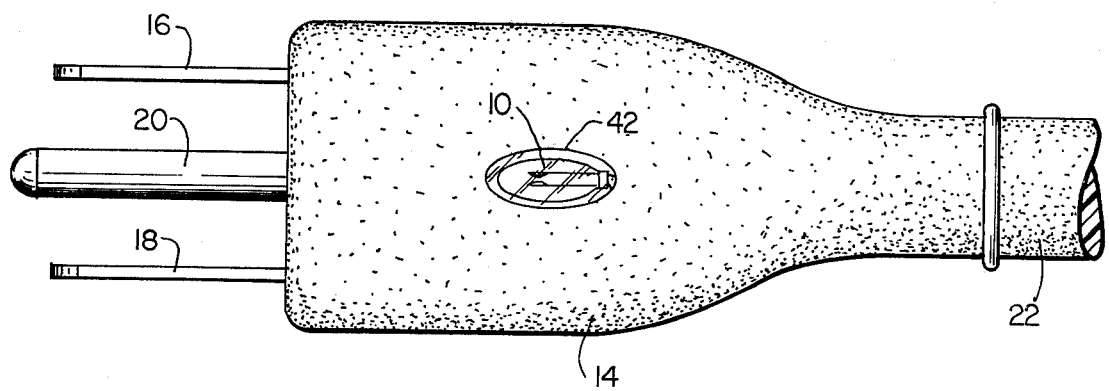
FIG. 4 is a top view with an electrical plug having the lack of the ground indicator of the present invention therein.

As shown in FIG. 4, the indicator 10 is enclosed within the insulating material 14 which includes an aperture 42 through which the activation of the light may be observed. By enclosing the indicator 10 within the body, the general external contour of the plug is not increased nor does it include any sharp edges. This configuration prevents any damage to the indicator, as well as making the plug convenient and easy to use. This configuration increases the life and reliability of the lack of ground indicator and electrical plug of the present invention.

Figure 5:
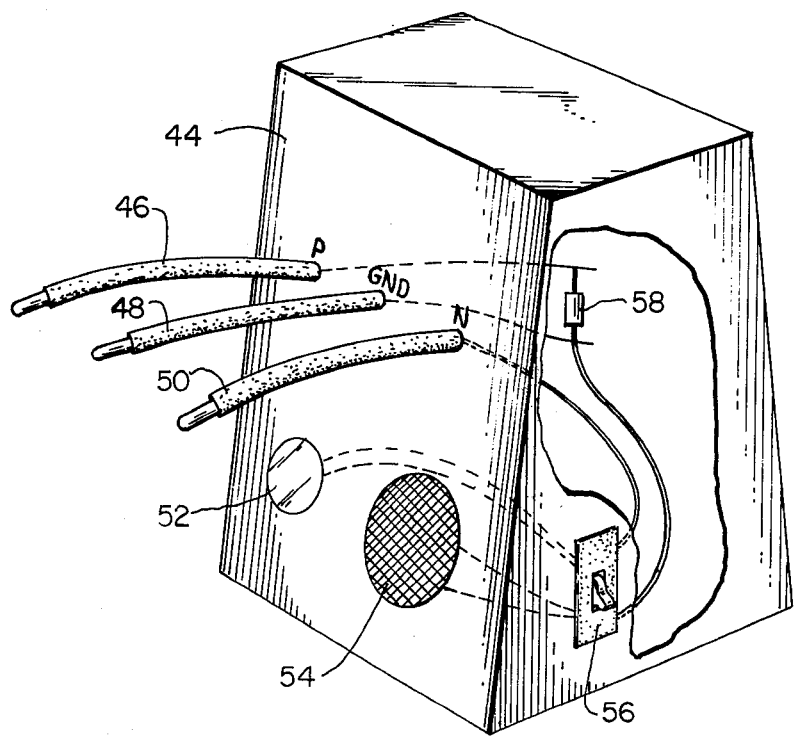
FIG. 5 is a perspective cutaway view of a ground testing device of the present invention.

The circuit of FIG. 2 may be employed in a testing device as depicted in FIG. 5 to indicate lack of ground in an electrical system or apparatus. The tester needs a housing 44 having three prongs or leads 46, 48 and 50 extending therefrom with corresponding positive (P), ground (GND) and neutral (N) indicia markings on the housing. Two indicators, a visual indicator 52 and an audible indicator 54 are connected to a three-way switch 56. By proper selection of the switch 56, the indication of lack of ground may be audible or visual or audible and visual combined. The electrical connection of the indicators 52 and 54 through switch 56 is between ground prong 48 and neutral prong 50. A resistor 58 is electrically connected between positive prong 46 and ground prong 48.

To test a specific circuit, system or apparatus, the positive prong 46 is attached or connected to a positive point in the to-be tested circuit, the neutral prong 50 to a neutral point in the to-be tested system, and the ground prong 58 to a grounded point in the to-be tested system. if the system is powered and a ground exists at the grounded point, no indication will be given. If, on the other hand, the grounded point is not grounded, either or both indicators 52, 54 (depending upon the position of the switch 56) will be activated to indicate a lack of ground.

The testing device of FIG. 5 may not only indicate lack of ground in a circuit requiring a ground, but also will indicate by deactivation of the indicator that a point in the circuit has been undesirably shortened to ground. Thus, the tester is not only useful in a laboratory or in industrial settings, but is useful in the home; for example, to the weekend auto mechanic trying to locate the source of his automobile's electrical system problem.

Although the invention has been described and illustrated in detail, it is to be clearly understood that the same is by way of illustration and example only and is not to be taken by way of limitation, the spirit and scope of the invention being limited solely by the terms of the appended claims.

What is claimed is:

1. In an electrical plug including a body of insulated material, a first and second prong secured in said body, a ground prong in said body, said prongs being electrically insulated from each other, the improvement comprising a resistor electrically connected between said first prong and said ground prong; and said electrical plug having a single indicator means, said indicator means being electrically connected between said second prong and said ground prong whereby said first prong is connected to a positive power line, said second prong is connected to a neutral power line, and ground prong is connected to a ground line, and said indicator means is activated upon the absence of a ground.

2. An electric plug as in claim 1 wherein said ground prong is an automatically retractable ground prong.

3. An electric plug as in claim 1 wherein said indicator is enclosed by said body and said body has an aperture for exposing a portion of said indicator.

4. An electrical plug for connecting a three-conductor cord to a grounded electrical receptacle comprising:
 a body of insulated material attached to said cord;
 a first and second prong secured in said body and electrically connected to a hot and a neutral conductor of said conductors, respectively;
 a ground prong in said body and electrically connected to the remaining conductor; and
 only a single indicator circuit including said prongs and consisting of a resistor in said body electrically connected between said first prong and said ground prong, and an indicator means in said body connected between said second prong and said ground prong for indicating absence of grounding of said remainder conductor when said plug is inserted in said grounded receptacle.

5. An electrical plug as in claim 4 wherein said indicator means is a light which is ignited to indicate said absence of ground.

6. An electrical plug as in claim 5 wherein said ground prong is a spring biased automatically retractable prong.

7. An electrical plug as in claim 4 wherein said indicator means is enclosed by said body and said body has an aperture for exposing a portion of said indicator means.

8. A lack of ground indicating device comprising:
 a first prong adapted to be connected to a positive point in an electrical system;
 a second prong adapted to be connected to a neutral point in said electrical system, said first prong and said second prong being electrically disconnected;
 a third prong adapted to be connected to a ground point in said electrical system;
 a resistor connected between said first prong and said third prong;
 a single indicator means connected between said second prong and said third prong for indicating absence of ground at said third prong when said first and second prongs are connected to said positive and neutral point of said electrical system, respectively.

9. A device as in claim 8 wherein said indicator means is a visual means which ignites to indicate said absence of ground.

10. A device as in claim 8 wherein said indicator means is an audible means which is activated to indicate said absence of ground.

* * * * *